Wright & Johnson.
Corn Harvester.

Nº 65324      Patented May 28, 1867.

Witnesses
W. Burris
Lew Beardsley

Inventor
John Wright & J. J. Johnson
Their Attorney G. B. T.

United States Patent Office.

JOHN WRIGHT AND J. J. JOHNSON, OF COLDWATER, MICHIGAN.

*Letters Patent No. 65,324, dated May 28, 1867.*

CORN-HARVESTER.

*The Schedule referred to in these Letters Patent and making part of the same.*

TO ALL WHOM IT MAY CONCERN:

Be it known that we, JOHN WRIGHT and J. J. JOHNSON, of Coldwater, in the county of Branch, and State of Michigan, have invented a new and useful improvement on a Machine for Cutting and Harvesting Corn; and we do hereby declare that the following is a full, clear, and exact description of the construction and operation of the same, reference being had to the annexed drawings, making a part of this specification, in which—

Our invention consists, first, of an improvement in the arrangement and operation of the cutting knives of a corn-harvester, one of the knives being so arranged and operated as to have a double or oblique motion by means of slotted or other proper guides operated by an eccentric shaft, or its equivalent, in combination with a stationary knife; second, of a tilting platform, in combination with stationary platforms, curved railing, curved spring arms, and spring feet or supporters, for the purpose of gathering and shocking the corn as it is cut and while the machine is in motion.

To enable others skilled in the art to make and use our invention, we will proceed to describe its construction and operation.

Like letters in the different figures of the drawings represent like parts of the machine.

Figure 1:
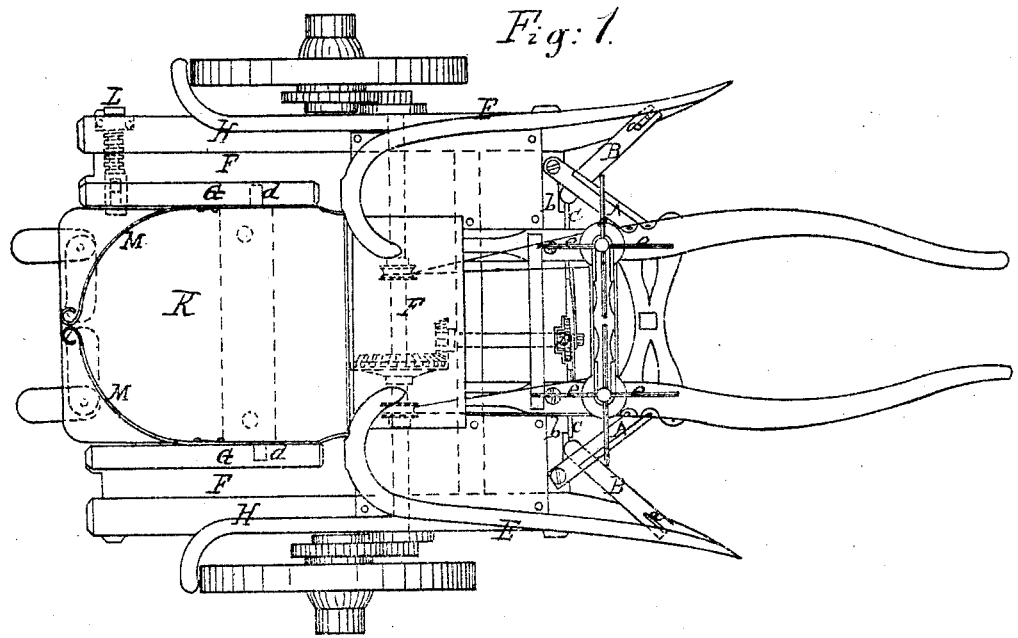
Figure 1 is a top view.
Figure 2:
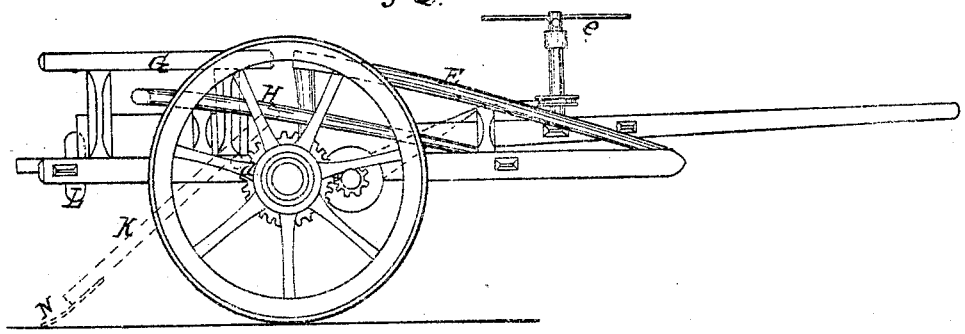
Figure 2 is a side view.
Figure 3:
Figure 3 is a view in detail of slotted guides and eccentric shaft or wheel for operating knives.

A A are stationary knives properly secured to the front cross-bar $b$. B B are movable knives, the forward ends of which are constructed with slots which operate upon guide-pins, $a\ a$, attached to the forward end of the side beams of the stationary platform; the other ends of the movable knives are properly attached to slotted guides, C C, which are operated by an eccentric wheel, D. We contemplate that eccentric wheels or cranks or other suitable guides may be substituted for the slotted guides and pins for giving the knives B B the double or oblique motion, which motion greatly facilitates the operation of cutting the stalks. The knives A A and B B are arranged crosswise, with their flat sides together similar to the two blades of a pair of shears, and their edges form an acute angle of about forty-five degrees. E E are curved rails on each side of the front part of the machine to secure the corn and to facilitate the gathering of the same as it is cut. F F F are stationary platforms with proper sides, G G and H H, for the workmen to operate upon in gathering and shocking the corn. K is a tilting-platform hung upon pivots $a\ a$, (see dotted lines, fig. 1,) or their equivalents, sufficiently near the forward end to allow the rear end to drop and rest on the ground, the platform being protected from injury when falling, and supported on the ground by the spring-feet or supporters N N attached to and projecting beyond the rear end, and is secured in place and tilted by means of the spring-catch L, or its equivalent, attached to and under the rear end of the platform F, (see dotted lines in fig. 1.) M M are curved spring-arms attached to the upright sides G G, and extend over and across the rear end of the tilting-platform for the purpose of supporting in upright position the corn as it is being arranged in shocks, and while the shocks are being lowered on the platform to the ground. This machine being constructed with two sets of knives, one set on each side, and the corn being in regular rows as planted by the corn-planter, it cuts and shocks two rows at the same time.

Operation.

By the forward motion of the machine, and the revolving motion of the arms of the reels $e\ e$, the stalks of the corn are gathered and pressed in between the knives, and are readily cut by the double or oblique motion of the knives B B in combination with the stationary knives. The corn falls back upon the platforms F F against the curved rails E E, from whence it is taken by the workman standing on the centre platform, and is arranged in upright position on the rear end of the tilting-platform K against the spring-curved arms M M, and when the platform is full he passes either side on the stationary platforms F F outside the sides G G, binds the tops of the shock, then drops the rear end of the platform and the shock slides off, being supported in upright position as it descends by the spring-arms, and the tops passing between them, and the corn is left standing in proper shape upon the ground. A pressure of the foot upon the forward end of the tilting-platform replaces it in horizontal position, where it is secured by the self-adjusting spring-catch.

*Claims.*

Having thus fully described our invention, what we claim therein as new, and desire to secure by Letters Patent, is—

1. The arrangement of the knives B B, with double or oblique motion, operated with slotted guides, or their equivalent, in combination with the stationary knives A A, substantially in the manner and for the purposes as herein set forth.

2. The tilting-platform K, in combination with the stationary platforms F F, the spring-curved arms M M, and spring-catch L, or its equivalent, substantially in the manner and for the purposes as herein described.

3. The cutting knives as arranged and operated in combination with the tilting-platform, substantially in the manner and for the purposes as herein described.

JOHN WRIGHT,
J. J. JOHNSON.

Witnesses:
 W. BURRIS,
 LEVI BEARDSLEY.